March 31, 1925. 1,531,525

P. SZEREMETA

CUSHIONED TIRE WHEEL

Filed July 30, 1924

Inventor

Peter Szeremeta

By

Attorney

Patented Mar. 31, 1925.

1,531,525

UNITED STATES PATENT OFFICE.

PETER SZEREMETA, OF CHICAGO, ILLINOIS.

CUSHIONED TIRE WHEEL.

Application filed July 30, 1924. Serial No. 729,155.

*To all whom it may concern:*

Be it known that I, PETER SZEREMETA, a citizen of Poland, residing in Chicago, in the county of Cook and State of Illinois, have invented certain new and useful Improvements in Cushioned Tire Wheels; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to wheels for automobiles and other wheeled vehicles. It has for its objects to provide a cushioned wheel possessing resiliency, strength, puncture resisting properties, durability, smoothness in running and otherwise adding to the efficiency of wheels of this general type. To the accomplishment of the foregoing and such other objects as may hereinafter appear the invention consists in the features hereinafter described and then sought to be clearly defined by the claims, reference being had to the accompanying drawing forming a part hereof, and in which Figure 1 is a side elevation of a portion of a wheel with parts in section;

Figure 1:
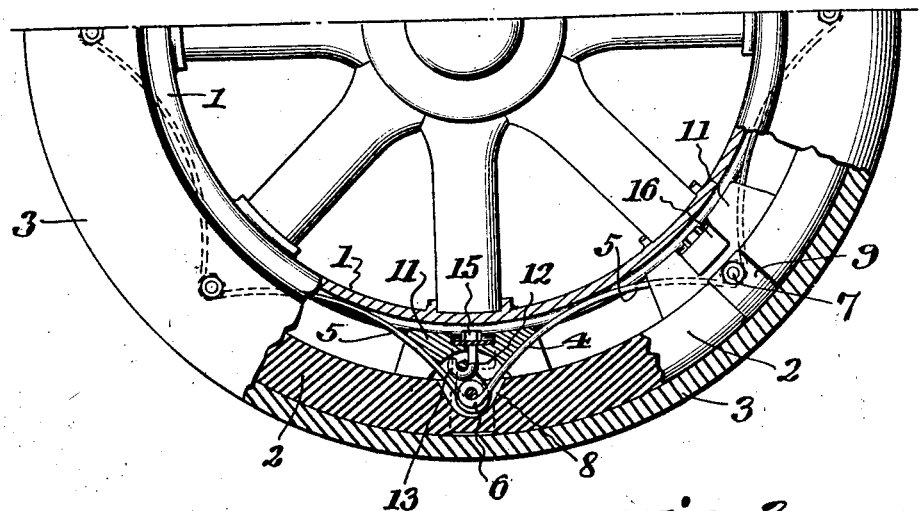
Figure 2:
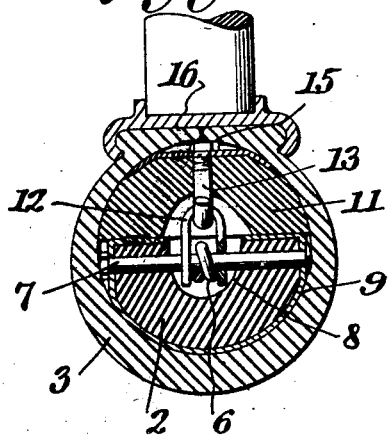
Figure 2 is a cross section through the wheel rim and associated parts.
Figure 3:
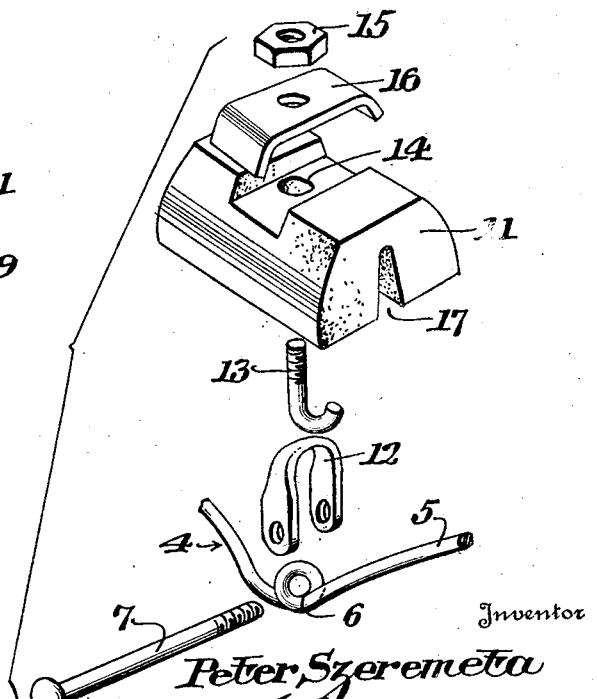
Figure 3 is a perspective of details of parts separated from one another.

In the drawing the numeral 1 designates a wheel rim of any suitable type and which will be provided with a cushioned tire formed as follows. It has a core 2 of solid vulcanized rubber which will be encased in a tread casing or shoe 3 of rubber or suitable tire-forming fabric. Connected with the inner face or portion of the rubber core 2 there is a spring 4 formed of heavy spring steel bent to form a series of arches 5 which at their meeting ends are formed with coiled loops 6 through which and through the rubber core will pass bolts 7 by which the spring and core will be connected together. The rubber core is recessed or formed with cavities 8 at the juncture of the arches of the spring to receive the coil loops of the spring, and metal bands 9 are applied to the exterior of the core where the recesses or cavities are formed so as to afford reinforcement and strength at such points, the bands being secured in place by the nutted bolts 7 which connect together the core and its arched formed spring. Opposite to the coils 6 of the arched springs are placed blocks 11 of soft vulcanized rubber to constitute elastic cushions at such points to take strains and contribute to the strength and resiliency of the tire and reduce to the minimum the possibility of breakage or fracture. These cushions are connected or coupled to the solid rubber core by means of saddle-loops 12 held in place by the bolts 7 which pass through the legs of the saddles and by hook-bolts 13 which pass through cavities 14 formed in the cushion-blocks and are held in place by nuts 15 applied to their threaded ends which bear against washers 16 seated in faces of the blocks, the hook ends of the bolts passing through the saddles 12 as illustrated. The cushion blocks are also formed at opposite ends with recesses 17 which receive the adjacent portions of the spring arches where they spring from the connecting coils of the arches. Thus the cushion blocks are held against displacement and the arches are reinforced and braced at their abutments.

By the construction described there is formed a cushioned tire having the advantages of a pneumatic tire without the disadvantages arising from punctures and more or less deflations. The circumferentially extending vulcanized rubber core affords resiliency in the direction of the axle and to a greater or less extent circumferentially so as to lessen shocks and vibrations. The arched springs and rubber cushions also give greater strength and durability to the tire and serve to minimize shocks and afford smoother running of the vehicle, and the several resilient members associated as shown contribute to greater co-operative efficiency.

While the details of each of the several parts illustrated and described is preferred there may be changes made therein without departure from the scope of the invention as sought to be defined by some of the appended claims. The tire having the characteristic features illustrated may be applied to a motor or other vehicle wheel under the "clincher" or any of the standard types in use where the construction admits of the application of a tire of the character indicated.

Having described my invention and set forth its merits what I claim is:—

1. A wheel rim, and a cushioned tire comprising a circumferentially disposed core, cushioning blocks lying between the rim and core, and a spring formed of arched members disposed between the core and wheel rim.

2. A wheel rim, and a cushioned tire comprising a circumferentially disposed core, cushioning blocks lying between the rim and core, and a spring formed of arched members disposed between the core and wheel rim, the core being recessed to receive the adjacent ends of the arched members of the spring, and portions of the spring arched members bearing against the cushioned blocks.

3. A wheel rim, and a cushioned tire, comprising a circumferentially disposed core, cushioning blocks lying between the rim and core, a spring formed of arched members disposed between the core and wheel rim and formed with coils at their adjacent ends, and means passing through the coils and core to connect the spring and core together.

4. A wheel rim, and a cushioned tire comprising a circumferentially disposed core, cushioning blocks lying between the rim and core, a spring formed of arched members disposed between the core and wheel rim and formed with coils at their adjacent ends, means passing through the coils and core to connect the spring and core together, and means coupling the cushioned blocks and core together.

5. A wheel rim, and a cushioned tire comprising a circumferentially disposed core, cushioning blocks lying between the rim and core, a spring formed of arched members disposed between the core and wheel rim and formed with coils at their adjacent ends, bolts passing through the coils and core to connect the spring and core together, saddle-loops secured by said bolts, and hook-members engaging the saddle-loops and coupling the cushion-blocks and core together.

6. A wheel rim, and a cushioned tire comprising a circumferentially disposed resilient core, cushioning blocks lying between the rim and core, a spring formed of arched members disposed between the core and wheel rim, the core and cushioned blocks being recessed to receive the adjacent ends of the arched members, and means coupling the core and cushioned blocks one to the other.

In testimony whereof I affix my signature in presence of two witnesses.

PETER SZEREMETA.

Witnesses:
WALTER KLAJBOR,
FRANK ZIELINSKI.